United States Patent [19]

Fuzzell

[11] 4,191,951
[45] Mar. 4, 1980

[54] DEVICE FOR SENSING FLUID FORCES
[75] Inventor: Joe E. Fuzzell, Peoria, Ill.
[73] Assignee: Caterpillar Tractor Co., Peoria, Ill.
[21] Appl. No.: 797,221
[22] Filed: May 16, 1977
[51] Int. Cl.² .......................... G08B 21/00; G01F 1/28
[52] U.S. Cl. ...................................... 340/610; 73/228;
73/DIG. 3; 200/84 C; 200/81.9 M; 324/207;
340/617
[58] Field of Search .................. 340/239, 241, 244 A,
340/246, 606, 608, 610, 611, 617; 324/207, 251;
73/228, DIG. 3; 200/84 C, 81.9 M, 61.2;
307/309, 118; 361/285

[56] References Cited
U.S. PATENT DOCUMENTS

| 2,442,275 | 5/1948 | Mayer | 340/246 X |
|---|---|---|---|
| 2,913,546 | 11/1959 | Guinn | 340/241 X |
| 3,208,276 | 9/1965 | Wood et al. | 324/207 X |
| 3,240,961 | 3/1966 | Noth | 324/251 X |
| 3,504,145 | 3/1970 | Layher | 340/244 A X |
| 3,534,191 | 10/1970 | Siakel | 340/626 X |
| 3,649,787 | 3/1972 | Kasabian | 340/566 X |
| 3,688,293 | 8/1972 | Sullivan | 340/309.4 X |
| 3,867,844 | 2/1975 | Shimizu et al. | 73/DIG. 3 |
| 3,942,526 | 3/1976 | Wilder et al. | 340/244 A X |

Primary Examiner—John W. Caldwell, Sr.
Assistant Examiner—Daniel Myer
Attorney, Agent, or Firm—Phillips, Moore,
Weissenberger, Lempio & Majestic

[57] ABSTRACT

A device capable of sensing forces exerted by fluids, particularly liquids, and thus may be used to sense fluid level and fluid flow. Preferred embodiments of the device include a switch means capable of being actuated without the exertion of substantial mechanical force thereon and an elongated body of low mass mounted for pivotal movement about an end thereof with switch actuation means at an end thereof in operative relation to the switch means only when the axis of elongation of the body is aligned with the switch means. Features of the device provide reduced inertial effects and reduced gravitational force requirements, as well as reduced wear, in operation.

4 Claims, 8 Drawing Figures

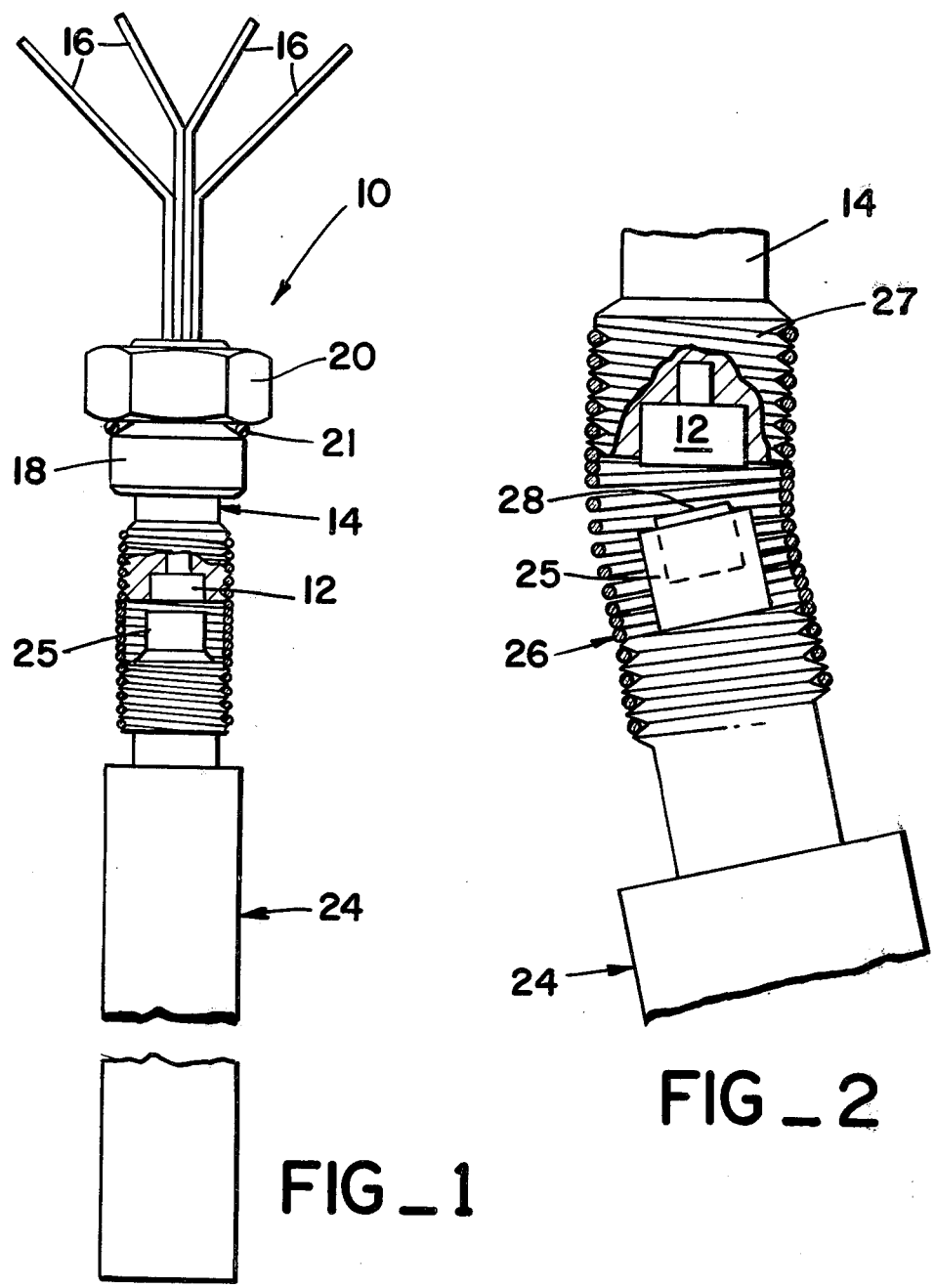
FIG_1
FIG_2
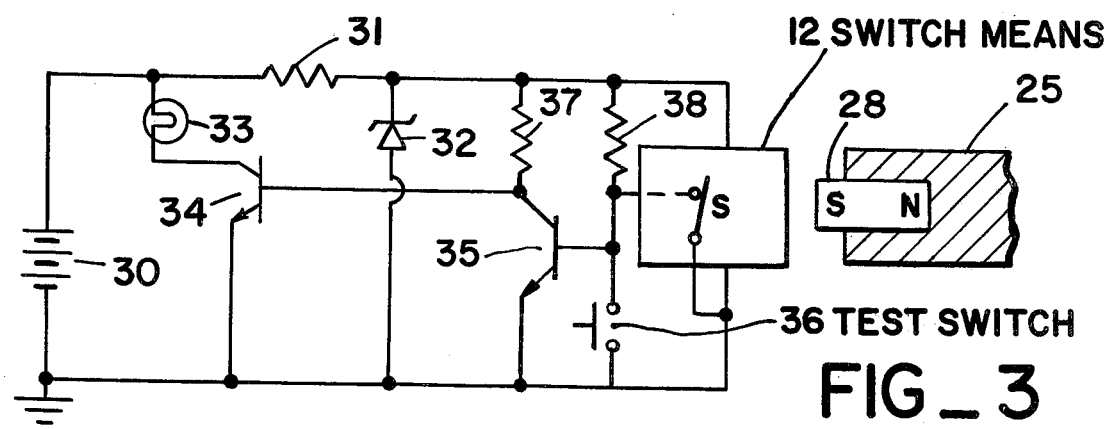
FIG_3

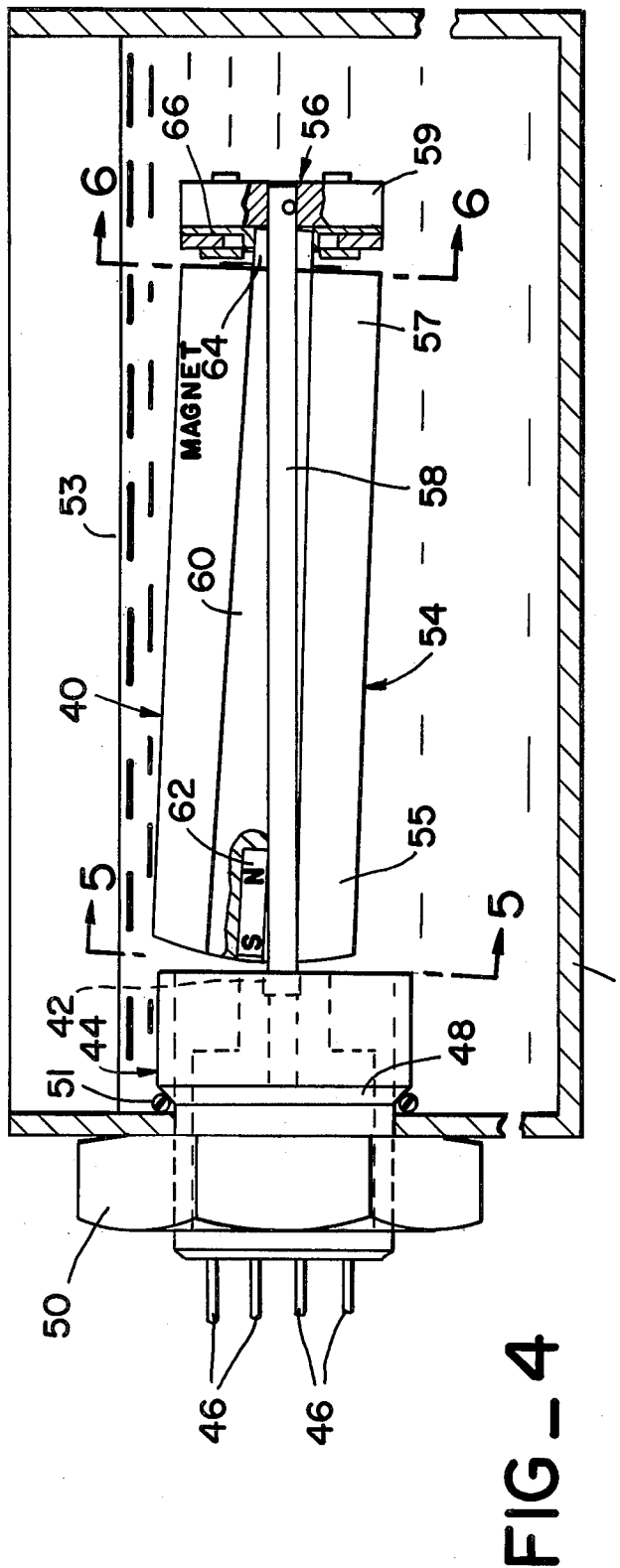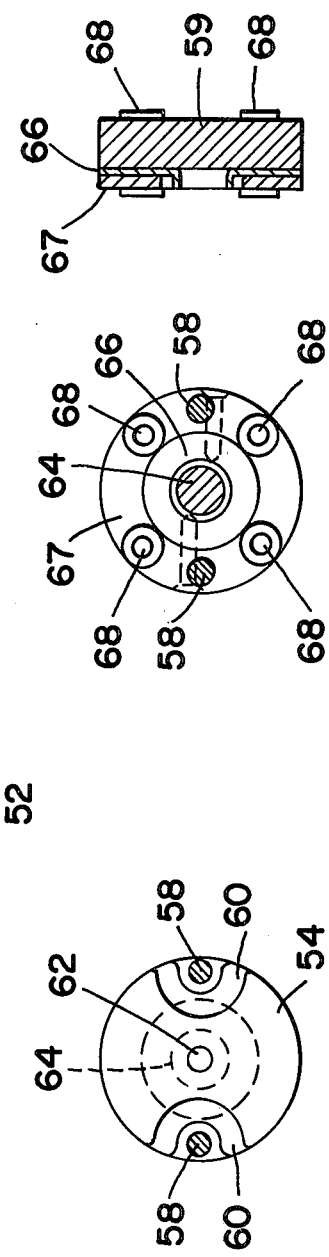

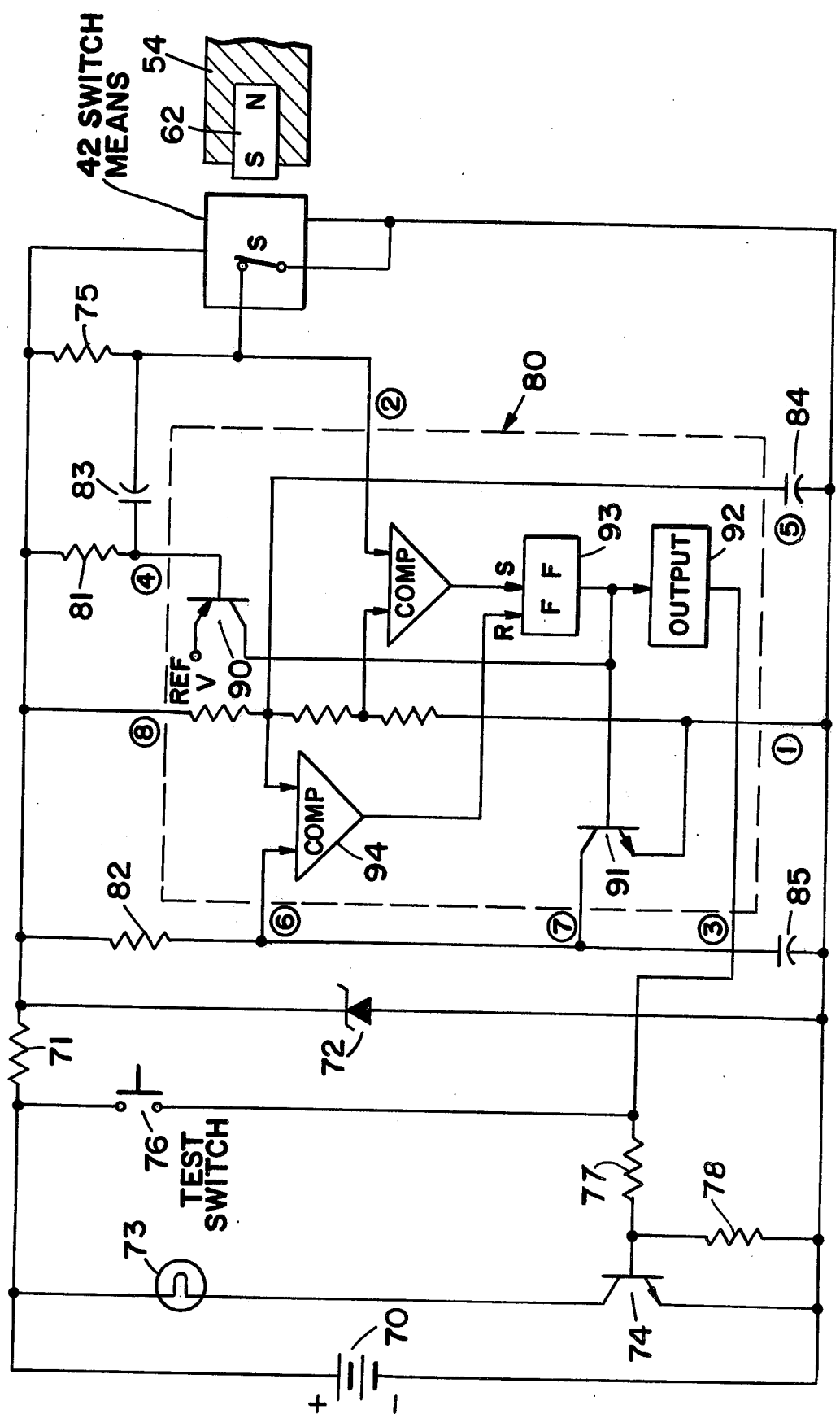
FIG_8

DEVICE FOR SENSING FLUID FORCES

BACKGROUND OF THE INVENTION

This invention relates to the sensing of fluid level and fluid flow and more particularly to a device for sensing forces exerted by fluids with reduced reliance on gravitational and inertial effects.

Devices proposed in the prior art for sensing fluid level and fluid flow have been based on mechanical linkages and movable parts which are subject to wear in operation and corrosion in use particularly in liquid environments. Such devices tend to be expensive to manufacture and difficult to install since their positioning in sensing fluid level or fluid flow is important to the operation of the device.

Devices of the prior art for sensing fluid level are basically different from devices of the prior art for sensing fluid flow in that devices of the prior art for sensing fluid level generally rely heavily on the force of gravity in their operation whereas devices of the prior art for sensing fluid flow, although they have substantial mass, are often designed to operate independently of the force of gravity. Thus, devices of the prior art for sensing fluid level and fluid flow are sensitive to inertial forces and tend to be unreliable when mounted on moving vehicles due to the inertial forces exerted thereon during operation of the vehicle.

SUMMARY OF THE INVENTION

The present invention is directed to overcoming one or more of the problems as set forth above.

Briefly, a device for sensing forces exerted by fluids according to this invention comprises a switch means capable of being actuated from a normal condition to an actuated condition without the exertion of substantial mechanical force thereon and a body of low mass elongated along a given axis and having switch actuation means at one end thereof. A first mounting means rigidly mounts the switch for actuation and a second mounting means mounts the elongated body with the end thereof including the actuation means adjacent the switch means. The second mounting means allows pivotal movement of the axis of elongation of the elongated body in any direction about an end thereof but prevents any substantial movement of the body along the axis of elongation. The second mounting means also biases the axis of elongation of the body to a position in which the switch actuation means is in operative relation to the switch means for actuating the switch means.

BRIEF DESCRIPTION OF THE DRAWING

The foregoing and other objects and features of this invention will be more fully understood from the following detailed description of preferred embodiments thereof when read in conjunction with the drawing wherein:

FIG. 1 is a side view in elevation of a first embodiment of the device according to the teaching of this invention partially broken away to show internal structure thereof.

FIG. 2 is an enlarged fragmentary view of the device of FIG. 1 partially broken away to show the physical relationship between internal parts thereof when force is exerted thereon by fluid.

FIG. 3 is a schematic diagram of an electrical circuit suitable for use with embodiments of this invention.

FIG. 4 is a side view in elevation of another embodiment of the device according to the teaching of this invention as mounted in a fluid reservoir shown in cross-section and with portions of the device broken away to show internal structure thereof.

FIG. 5 is a view taken along line 5—5 of FIG. 4.

FIG. 6 is a view taken along line 6—6 of FIG. 4.

FIG. 7 is a side view in elevation of a part of the device shown in FIG. 4.

FIG. 8 is a schematic diagram of another electrical circuit suitable for use in embodiments of this invention.

DETAILED DESCRIPTION OF PREFERRED EMBODIMENTS

According to the embodiment 10 of this invention as shown in FIG. 1, an electrical switch means 12 is embedded in the end of a mounting post 14. The mounting post 14 has a passageway extending axially therethrough to enable two or more electrical conductors 16 to be sealed therein for making electrical connection to the switch means 12.

The mounting post 14 is provided with an annular shoulder 18 intermediate its ends and the exterior surface of the end of the mounting post 14 remote from the switch means 12 is threaded to receive a nut 20. Thus the end of the mounting post 14 remote from the switch means 12 may be passed through an aperture in the wall of a fluid reservoir or conduit and the nut 20 threaded thereon to rigidly secure the mounting post 14 to the wall of the fluid reservoir. A rubber O ring or gasket 21 is provided to be captured between the shoulder 18 of the mounting post 14 and the wall of the fluid reservoir about the aperture through which the threaded end of the mounting post 14 is passed. Thus, upon tightening the nut 20 on the threaded end of the mounting post 14, the gasket 21 will make a fluid tight seal between the mounting post 14 and the wall of the fluid reservoir.

An elongated body 24 is positioned with one end 25 in operative relation to the switch means 12 and with its axis of elongation coaxial with the mounting post 14. According to this invention, the elongated body 24 is mounted with respect to the switch means 12 for pivotal movement of its axis of elongation about one end thereof by a means which biases the axis of elongation of the elongated body 24 to the position shown in FIG. 1 in which one end 25 of the elongated body is in operative relation to the switch means 12 and which means prevents any substantial movement of the elongated body along the axis of elongation thereof.

As best shown in FIG. 2, the means 26 for mounting the elongated body 24 according to this embodiment of the invention, comprises a tightly wound helical spring. The exterior surface of the end of the mounting post 14 surrounding the switch means 12 is provided with appropriate threads 27 and the helical spring mounting means 26 is dimensioned so that the turns at one end thereof may be threaded onto the mounting post 14. Similarly the exterior surface of the elongated body at the end 25 thereof adjacent the switch means may be appropriately dimensioned and provided with threads so that the turns at the other end of the helical spring mounting means 26 may be threaded thereon. Thus, the elongated body 24 will be resiliently fixed to the mounting post 14 with its axis of elongation in coaxial alignment therewith and with one end 25 thereof adjacent the switch means 12. Forces exerted by a fluid on the elongated body 24 will tend to cause the axis of elongation thereof to pivot about the end 25 thereof as shown in FIG. 2 by extending the turns of the helical spring mounting means 26 at the side from which the force is acting and compressing the turns of the helical spring mounting means 26 on the opposite side thereof.

As best shown in FIG. 2, the end 25 of the elongated body 24 is provided with means 28 for actuating the switch means 12. The pivotal movement of the elongated body 24 about the end 25 thereof will tend to remove the actuating means 28 from operative relation to the switch means 12. According to this invention, the switch means 12 is capable of being actuated from a normal condition to an actuated condition without the exertion of substantial mechanical force thereon by the actuation means 28. In preferred embodiments of this invention, the switch means 12 is a solid state Hall effect device and the actuation means 28 is a permanent magnet so that no mechanical contact need occur between the actuation means 28 and the switch means 12 for actuation thereof.

Further, in accordance with preferred embodiments of the teaching of this invention, the elongated body 24 is made of a light weight plastic such as polysulphone reinforced with fiberglass and is preferably hollow so that it will have very low mass. It will be seen that the helical spring mounting means 26 will permit the axis of elongation of the elongated body 24 to pivot in any direction about the end 25 thereof. Thus, it is preferable that the exterior surface of the elongated body 24 be a right circular cylinder so that the device 10 may be mounted without regard to the rotational position of the elongated body 24 about its axis of elongation.

Referring to FIG. 3, the end 25 of the elongated member 24 with a permanent magnet actuating means 28 embedded therein in operative relation to a solid state Hall effect switch 12 and the electrical circuitry connected to the switch 12 are shown schematically. Thus, as shown in FIG. 3, the solid state Hall effect device 12 is connected across an appropriate source of electrical energy such as the battery 30 in series with a current limiting resistor 31 and in parallel with a zener diode 32. An indicator lamp 33 and transistor 34 are connected in series with each other across the battery 30. When the actuating magnet 28 in the end 25 of the elongated body is in operative relation to the Hall effect switch device 12 as shown in FIG. 3, the switch device 12 will be actuated to turn off transistor 35 by grounding its base. This effectively provides base drive via resistor 37 to switch transistor 34 into conduction and energize indicator lamp 33.

Upon pivoting of the elongated member 24 about the end 25, magnet 28 is moved out of operative relationship with the switch means 12. The switch means 12 will therefore open to remove the ground at the base of transistor 35 and permit base drive through resistor 38 to turn on transistor 35. The base of transistor 34 is then grounded through the collector-emitter circuit of transistor 35, thus turning off transistor 34 and de-energizing the indicator lamp 33.

From the above it will be understood that the device 10 as shown in FIG. 1 may be mounted through the wall of a fluid reservoir or conduit with its axis extending vertically as shown in FIG. 1, for example. So long as there is a flow of fluid within the conduit or reservoir, the elongated body 24 will be deflected as indicated in FIG. 2, the actuation means 28 will be moved out of operative relation to the switch means 12 and the indicator lamp 33 will remain dark. If the flow of fluid should cease, the helical spring mounting means 26 will tend to return the elongated body 24 to the position shown in FIG. 1, bringing the actuation means 28 into operative relation with the switch means 12 and causing the indicator lamp 33 to light as described above. As shown in FIG. 3, a test switch 36 may be connected in parallel with the switch means 12 and adapted to be manually operated to light the indicator lamp 33 in order to test the indicator lamp 33 and transistors 34 and 35 for malfunction thereof.

The mounting post 14 may be a tubular nonmagnetic metallic body having the switch means 12, resistor 37 and resistor 38 embedded in an insulating material sealingly received within the tubular mounting post 14. The electrical conductors 16 provide appropriate electrical connections to the remainder of the circuitry shown in FIG. 3.

The device 10 could also be mounted with the axis of elongation of the elongated body 24 extending horizontally within a fluid reservoir in order to sense fluid level. The elongated body 24 preferably should be a hollow tube closed at both ends for use in sensing fluid level to provide a float of low mass. The helical spring mounting means 26 should be made of a stainless nonmagnetic spring steel of sufficient strength to bias the elongated body 24 to the coaxial position shown in FIG. 1, in spite of its distributed weight when mounted in the horizontal position. Thus, when there is sufficient fluid in the reservoir to deflect the elongated body 24 away from its coaxially aligned position to the position shown in FIG. 2, the indicator lamp 33 will be turned off. If the fluid level in the reservoir should fall below the level required to deflect the elongated body 24, then the indicator lamp 33 would be turned on and would remain on until a fluid level sufficient to deflect the elongated body 24 is restored.

Since the mass of the elongated body 24 may be very low and since substantially no mechanical force is required to actuate the switch means 12, the device 10 will be relatively insensitive to inertial forces acting thereon. Thus the device 10 can be used in moving vehicles to sense either fluid flow or fluid level in conduits or reservoirs with reduced tendency to give spurious indications due to inertial forces generated by the movement of the vehicle. It will be seen that the device 10 has a minimum of moving parts exposed to the fluid and that corrosive effects of the fluid on the parts of the device 10, if any, will not tend to interfere with its operation. There is substantially no wear involved in the operation of the device 10 thus insuring long life and dependable operation. The device 10 may be quickly and easily installed with minimum attention to the orientation of the device 10 and the device 10 is simple and inexpensive to fabricate.

The switch means 12 may be any suitable microswitch which does not require any substantial mechanical force for actuation thereof. In an actual embodiment of this invention as described hereinabove, the switching device 12 was a solid state Hall effect device sold under the type number 513SS16 by MICRO-SWITCH DIVISION of Honeywell Corporation. The switch actuating means 28 with a cylindrical permanent magnet approximately ¼ inch (6 mm) in diameter and ¼ inch (6 mm) long, of sufficient strength to actuate the switch device 12.

Referring to FIG. 4, a device 40 according to another embodiment of this invention is shown. The device 40 includes a switch means 42 embedded in one end of the mounting post 44. A plurality of insulated electrical conductors 46 extend through the mounting post 44 from the other end thereof and are connected to the switch means 42. The mounting post 44 is provided with a shoulder 48 intermediate its ends and the end of the mounting post 44 remote from the switch means 42 is threaded to receive a nut 50. Thus as shown in FIG. 4, a rubber O ring or gasket 51 may be placed over the threaded end of the mounting post 44 and seated against the shoulder 48 and the mounting post 44 may be rigidly mounted on the wall 52 of a fluid reservoir by passing the threaded end of the mounting post 44 through an aperture in such wall 52 and applying the nut 50 thereto with the O ring or gasket 51 compressively held between the shoulder 48 and the interior surface of the wall 52 to provide a fluid tight seal. As shown in FIG. 4, the device 40 is mounted immediately below the desired level 53 of fluid contained within the walls 52 of the reservoir.

The device 40 includes an elongated body 54 positioned with one end 55 adjacent the switch means 42. According to this embodiment of the invention, the elongated body 54 is mounted on the mounting post 44 by a mounting means 56 which permits the axis of elongation of the body 54 to pivot in any direction about the other end 57 thereof remote from the switch means 42.

The mounting means 56 according to this embodiment of the invention includes a pair of rods 58 each having one end fixed in the mounting post 44 on opposite sides of the switch means 42. A metallic plate or disc 59 is mounted on the free ends of the rods 58. The elongated body 54 is captured between the rods 58 at its sides and between the mounting post 44 and the plate 59 at its opposite ends.

As best shown in FIG. 5, the elongated body 54 has a diameter larger than the spacing between the rods 58 and is provided with a pair of grooves 60 extending along opposite sides thereof to receive the rods 58. The grooves 60 have smoothly curved walls tapering from a larger radius of curvature at the end 55 of the elongated body 54 adjacent the switch means 42 to a smaller radius of curvature closely surrounding the rods 58 at the end 57 of the elongated body 54 adjacent the plate 59. Thus, the axis of elongation of the elongated body 54 is permitted to pivot about the end 57 thereof adjacent the plate 59 in any direction limited only by contact between the rods 58 and the walls of the grooves 60 and in FIG. 4 the elongated body 54 is shown pivoted upwardly toward the fluid level 53 by flotation forces exerted thereon by the fluid.

According to this embodiment of the invention, a switch actuation means 62 in the form of a permanent magnet is embedded in the end of the elongated body 54 adjacent the switch means 42. As described hereinabove, the switch means 42 may be a solid state Hall effect device adapted to be actuated when the permanent magnet switch actuating means 62 is aligned therewith. As shown in FIG. 4, the permanent magnet switch actuating means 62 is displaced from alignment with the switch means 42 so that the switch means 42 is not actuated when the fluid level 53 is sufficiently high to cause the elongated body 54 to pivot to the position shown in FIG. 4.

According to this embodiment of the invention, the elongated body 54 is biased to a position in which the permanent magnet switch actuating means 62 will be aligned with the switch means 42 by means of a further permanent magnet 64 protruding from the end 57 of the elongated body 54 into contact with the metal plate 59.

The metal plate 59 must, of course, be made of magnetic material according to this embodiment of the invention and the permanent magnet 64 and plate 59 should have flat abutting surfaces. The permanent magnet 64 should have sufficient strength to support the distributed weight of the elongated body 54 with its axis of elongation in a horizontal position when no force is exerted on the elongated body 54.

Referring to FIGS. 6 and 7, it will be seen that according to this embodiment of the invention, the magnet 64 is received in an annular rubber grommet 66 which is secured to the surface of the plate 59 facing the elongated member 54 by means of a washer 67 and a plurality of rivets 68. The rivets 68 pass through the metal plate 59, rubber grommet 66 and washer 67 and the magnet 64 is resiliently received within the rubber grommet to thereby provide for the pivoting of the elongated member 54 about its end 57.

The biasing action provided by the magnet 64 provides a retrograde force which provides desirable characteristics in operation. Thus, as soon as the elongated body 54 is deflected slightly from its normal position, the biasing force exerted by the magnet 64 will decrease, allowing the elongated body 54 to pivot to an extreme position as illustrated in FIG. 4 so that the actuating magnet 62 is completely removed from operative relation to the switch means 42. Similarly, when the force ceases to be exerted on the elongated body 54, the force exerted by the magnet 64 will increase as the elongated body approaches the aligned position to which it is normally biased and such aligned position will tend to be maintained against shock forces of short duration exerted on the elongated body 54.

Although the rods 58 are shown aligned in a horizontal plane in FIG. 4, it will be understood that such alignment is not necessary. The elongated body 54 may pivot in any direction abouts its end 57 to the full extent allowed by the tapered grooves 60. However, the elongated body 54 is reliably captured by the plate 59 and rods 58 and thus, even after extensive use involving the subjection of the elongated body 54 to a variety of forces, it cannot escape to float freely in the conduit or reservoir.

The embodiments of a device according to the teaching of this invention as described hereinabove are particularly suited for use on moving vehicles where they will be subjected to inertial forces in operation. Thus, the elongated bodies 24 and 54 of embodiments of this invention have very low mass and are biased by a spring or magnet to a particular position. They have large surface area in relation to their mass and are thus sensitive to forces exerted by fluids thereon but relatively insensitive to inertial forces. Nevertheless, inertial forces acting on the fluids to which the devices are exposed, as well as on the devices themselves, may produce spurious actuation of the switch means thereof. Thus, the electrical circuit shown schematically in FIG. 8 is adapted for use with devices according to the teaching of this invention in order to avoid the effects of such spurious responses which are characteristically of short time duration.

Referring to FIG. 8, a fragmentary representation of an elongated body 54 and switch actuating magnet 62 in operative alignment with a switch means 42 is presented. The switch means 42 is shown schematically as connected across a power source in the form of a battery 70 in series with a current limiting resistor 71 and in parallel with a zener diode 72. An indicator lamp 73 and transistor 74 are connected in series across the battery 70 so that the indicator lamp 73 will be turned on when the transistor 74 is rendered conductive.

As described hereinabove, the switch device 42 is a solid state Hall effect device adapted to conduct current when the switch actuating magnet 62 is aligned therewith as shown in FIG. 8. The current conducted by the switch device 42 develops a signal across a load resistor 75 the presence or absence of which serves as the input to a timing circuit 80 shown within dotted lines and which timing circuit 80 generates a signal that is applied to the base of the transistor 74 through the resistors 77 and 78 to turn the indicator lamp 73 on or off, as will be more fully described hereinafter. A manually operable test switch 76 is connected in parallel with the timer circuit to enable the indicator lamp 73 and transistor 74 to be tested for operability.

The timer circuit 80 as shown within the dotted lines in FIG. 8, is a commercially available Signetics SE555CV monolithic linear integrated timer circuit having pins 1 through 8 and connected with external resistors 81 and 82 and external capacitors 83, 84 and 85 to provide a time delay as described below. According to this invention, the timer circuit 80 is adapted to provide a time delay before switching from one mode of operation to its opposite mode of operation. Thus, for example, if the switch actuating magnet 62 is in operative relation to the switching device 42 for a period of five milliseconds, the indicator lamp 73 will be turned on and will remain on so long as such operative relationship is maintained. If the elongated body 54 is deflected to move the switch actuating magnet 62 out of operative relationship to the switching device 42 for a period of more than five milliseconds, the indicator lamp 73 will be turned off and will remain off so long as the operative relationship is not reestablished. If the deflection of the elongated member 54 is of short duration, the indicator lamp will be turned on again after operative alignment of the switch actuating magnet 62 and switching means 42 has been reestablished for five milliseconds and the off time of the indicator lamp 73 may not be discernable by the human eye. Thus, the indicator lamp 73 will tend not to give random indications if the probe is deflected due to inertia or other spurious forces and the indication given by the indicator lamp 73 will tend to be truly representative of the presence or absence of a given flow or level.

The operating characteristics of the timer circuit 80 shown within the dotted lines in FIG. 8 are well known in the prior art. Considering the elements of the schematic in addition to the timer circuit 80 as shown in FIG. 8, the capacitor 83 will remain discharged until the switching device 42 is closed by the switch actuating magnet 62. Whenever the switching device 42 is closed, a negative signal will be developed across the resistor 75 and will be initially coupled through the capacitor 83 to the pin 4 of timer circuit 80 as well as being directly connected to pin 2 of the timer circuit 80. The capacitor 83 and resistors 75 and 81 are selected to provide a charging time for the capacitor 83 of five milliseconds. Pin 4 of the timer circuit 80 is the reset terminal and when it is low, the output terminal pin 3 of timer circuit 80 is also low. After five milliseconds, capacitor 83 is charged removing the low at pin 4 and pin 3 of the timer circuit 80 can then go high to render the transistor 74 conductive and turn on the indicator lamp 73. As long as the negative signal continues to be applied to pin 2 of the timer circuit 80, the output terminal pin 3 of timer circuit 80 will remain high.

Thus, whenever the switching device 42 is closed, a negative signal is applied to pin 2 of the timer circuit 80 and such negative signal is also applied to pin 4 of timer circuit 80 for five milliseconds turning on the reset transistor 90 of timer circuit 80 for five milliseconds. The reference voltage through the reset transistor 90 causes the discharge transistor 91 of timer circuit 80 to conduct and the capacitor 85 abruptly discharges through the transistor 91. The reference voltage through the reset transistor 90 is also applied to the output stage 92 of timer circuit 80, thereby maintaining pin 3 of timer circuit 80 low for five milliseconds until the capacitor 83 reaches its full charge, at which point pin 3 of timer circuit 80 goes high and renders the transistor 74 conductive, turning on the indicator light 73.

A momentary opening of the switching device 42 as by a deflection of the elongated body 54 due to inertial effects will remove the negative signal on pin 2 of timer circuit 80 but the internal flip-flop circuit 93 of timer circuit 80 will remain set, causing pin 3 of timer circuit 80 to remain high until the capacitor 85 charges to a preselected voltage as established by comparator 94 to cause the flip-flop circuit 93 to reset. If the elongated body 54 merely oscillates and returns to the position shown in FIG. 8 again closing the switching device 42 before the capacitor 85 reaches the given charge, the reset signal is not produced and the five millisecond signal at pin 4 resulting from the reclosure of the switching device 42 will again cause the capacitor 85 to discharge and tend to drive pin 3 to its low output. It is believed that the five millisecond charging time of the capacitor 83 during which the reset transistor 90 is conductive is not enough to allow the output stage 92 of the timer 80 and the transistor 74 to respond and permit the indicator lamp 73 to turn off. However, even if this should occur, the five millisecond off interval for the indicator lamp would not be discernable to the human eye.

So long as transient movements of the elongated body 54 permit the switching device 42 to reclose before the capacitor 85 can charge to the given preselected voltage, the indicator lamp 73 will remain on just as it would if the elongated body 54 remained in its aligned position as shown in FIG. 8. If the elongated body is deflected and remains deflected due to forces exerted thereon by a desired fluid flow or a proper fluid level for more than five milliseconds pin 4 of the timer 80 will go high, turning off the reset transistor 90 and discharge transistor 91. The capacitor 85 can then charge to the given preselected level and pins 6 and 7 of the timer 80 will go high. At that point the internal flip-flop 93 will reset, causing the output of the timer 80 at pin 3 to go to its low value and render the transistor 74 nonconductive, turning off the indicator lamp 73. If the switching device 42 is subsequently closed by transient movements of the elongated body 54 which momentarily align the switch actuating magnet 62 with the switching device 42, it will tend to turn on the indicator lamp 73 after a five millisecond delay. If the switch actuating magnet 62 should remain aligned with switching device 42 for more than five milliseconds, the indicator lamp 73 would be turned on but assuming that such alignment between the switch actuating magnet 62 and the switching device 42 is transient, the capacitor 85 will again recharge to reset the internal flip-flop 93 and turn and indicator lamp off.

Thus, where no force is exerted on the elongated member 54 by the fluid, the switch actuating magnet 62 and switching device 42 will tend to remain in alignment and the circuitry shown in FIG. 8 will tend to maintain the indicator lamp 73 in its on condition in spite of momentary deflections of the elongated body 54 due to inertial forces. Where force is exerted on the elongated body 54 by the fluid to deflect it so that the switch actuating magnet 62 is not in alignment with the switching device 42, the indicator lamp 73 will be turned off and will tend to remain off producing only occasional flashes, if any at all, when inertial forces acting on the elongated body 54 are sufficient to overcome the fluid forces acting thereon and produce momentary alignments between the switch actuating magnet 62 and switching device 42.

It is believed that those skilled in the art will make various modifications in the preferred embodiments of this invention as shown in the drawing and described hereinabove. For example, switching devices other than solid state Hall effect devices could be used together with appropriate switch actuating means other than permanent magnets. The switching device could be normally closed and adapted to be opened by the switch actuating means. Switching devices according to the teaching of this invention could be used with electrical or electromechanical circuitry other than that disclosed herein and various obvious modifications could be made in the device to adapt it for specific applications.

The embodiments of the invention in which an exclusive property or privilege is claimed are defined as follows:

1. A device for sensing forces exerted by fluids comprising:
   (a) switch means capable of being actuated from a normal condition to an actuated condition without the exertion of substantial mechanical force thereon;
   (b) first mounting means rigidly mounting said switch means for actuation;
   (c) a body of low mass elongated along a given axis and having switch actuation means at one end thereof; and
   (d) second mounting means mounting said elongated body with said one end thereof adjacent said switch means, said second mounting means allowing pivotal movement of said given axis of elongation of said body in any direction about an end thereof but preventing substantial movement of said body along said given axis of elongation thereof and biasing said given axis of elongation of said body to a position in which said switch actuation means is in operative relation to said switch means actuating said switch means to said actuated condition thereof, said second supporting means comprising a pair of elongated rods of given length mounted at one end on said first mounting means and carrying a magnetic metallic plate at their other ends; said given axis of elongation of said elongated body having a length slightly shorter than said given length of said elongated rods and said elongated body having a second magnet means mounted in the other end thereof, said elongated body being carried between said elongated rods with said other end adjacent said magnetic metallic plate cooperating with said second magnetic means to bias said given axis of elongation of said body toward said position in which said switch actuation means is in operative relation to said switch means.

2. A device as claimed in claim 1 wherein said elongated body is provided with grooves along the sides thereof receiving said elongated rods therein with clearance between the exterior of said elongated rods and the interior of said grooves.

3. A device as claimed in claim 2 wherein the transverse dimensions of said elongated rods are substantially constant throughout their length and said grooves taper from transverse dimensions substantially larger than said transverse dimensions of said elongated rods at said one end of said elongated body to transverse dimensions more closely surrounding said transverse dimensions of said elongated rods at said other end of said elongated body.

4. A device as claimed in claim 1, wherein said magnetic metallic plate and said second magnetic means cooperate to provide a retrograde force biasing said given axis of elongation of said body toward said position in which said switch actuation means is in operative relation to said switch means.

* * * * *